United States Patent
Sato et al.

(10) Patent No.: US 7,133,966 B2
(45) Date of Patent: Nov. 7, 2006

(54) DISK ARRAY DEVICE HAVING SPARE DISK DRIVE AND DATA SPARING METHOD

(75) Inventors: Hajime Sato, Odawara (JP); Shigeo Honma, Odawara (JP)

(73) Assignee: Hitachi, Ltd., Tokyo (JP)

( * ) Notice: Subject to any disclaimer, the term of this patent is extended or adjusted under 35 U.S.C. 154(b) by 224 days.

(21) Appl. No.: 10/767,196

(22) Filed: Jan. 30, 2004

(65) Prior Publication Data

US 2005/0086557 A1     Apr. 21, 2005

(30) Foreign Application Priority Data

Oct. 15, 2003     (JP) .............................. 2003-354557

(51) Int. Cl.
*G06F 12/00* (2006.01)

(52) U.S. Cl. ...................................... 711/114

(58) Field of Classification Search ................... None
See application file for complete search history.

(56) References Cited

U.S. PATENT DOCUMENTS

| | | | |
|---|---|---|---|
| 5,418,925 A | 5/1995 | DeMoss et al. | |
| 5,611,069 A | 3/1997 | Matoba | |
| 5,727,144 A | 3/1998 | Brady et al. ............ | 395/182.04 |
| 6,154,853 A * | 11/2000 | Kedem ........................ | 714/6 |
| 6,223,252 B1 | 4/2001 | Bandera et al. | |
| 6,442,711 B1 | 8/2002 | Sasamoto et al. ............. | 714/38 |
| 2001/0012442 A1* | 8/2001 | Kodama ....................... | 386/98 |
| 2003/0056142 A1 | 3/2003 | Hashemi | |
| 2003/0088803 A1 | 5/2003 | Arnott et al. | |
| 2003/0225970 A1 | 12/2003 | Hashemi | |
| 2004/0260967 A1 | 12/2004 | Guha et al. | |

FOREIGN PATENT DOCUMENTS

| | | |
|---|---|---|
| JP | 10320129 | 12/1998 |
| JP | 2002297322 | 10/2002 |
| JP | 2002-373059 | 12/2002 |
| JP | 2003-186630 | 7/2003 |

* cited by examiner

*Primary Examiner*—Sanjiv Shah
*Assistant Examiner*—Midys Rojas
(74) *Attorney, Agent, or Firm*—Mattingly, Stanger, Malur & Brundidge, P.C.

(57) ABSTRACT

In a disk array of the RAID constitution, a likelihood of occurrence of a failure is predicted from the number of times of error occurrence for each of disk drives #0 to #3 in a certain parity group. Two storage areas #0_UH and #2_LH of a half size, which are different in data stripes from each other, are selected from two disk drives #0 and #2 having a relatively high likelihood of occurrence of a failure, respectively, and the data thereof is copied to a spare disk #A (divided data copy). When the likelihood of occurrence of a failure of one disk drive #0 further increases, the remaining half storage area #OLH of the disk drive #0 is copied to the spare disk #A (dynamic sparing). Dynamic sparing time is reduced and a likelihood of data lost due to a multiple disk failure by employing the divided data copy processing.

24 Claims, 13 Drawing Sheets

DISK ARRAY DEVICE HAVING SPARE DISK DRIVE AND DATA SPARING METHOD

CROSS REFERENCE TO RELATED APPLICATION

The basic foreign application filed on Oct. 15, 2003, No. 2003-354557, in Japan is hereby incorporated by reference.

BACKGROUND OF THE INVENTION

The present invention relates to a disk array device having plural disk drives and spare disk drives provided with the RAID (Residential Array of Independent Disks) function, in which data is copied from plural disk drives to one or plural spare disk drives in parallel, and a control method for the same.

Conventionally, a disk array device is provided with spare disk drives, in addition to employment of the RAID function, to improve the reliability thereof. In such a disk array device, when trouble has occurred in one of the disk drives constituting the RAID configuration, data is recovered from the other disk drives constituting the RAID configuration and is copied to the spare disk drives (correction copy), whereby the disk array device is recovered from a degenerate operation of the RAID function to a normal access state. However, since the disk array device sometimes enters the degenerate operation at the time of data recovery, there are problems in the reliability and performance thereof. Thus, the reliability is improved by analyzing an error history of the disk drives to predict the likelihood of a failure and by copying data in disk drives having a high likelihood of a failure to spare disk drives before a failure occurs (an operation called dynamic sparing).

However, recently, disk drives tend to have a larger capacity and are often used in a high load environment. Thus, the time required for the above-mentioned correction copy and dynamic sparing operations is increased.

Therefore, there is higher likelihood of occurrence of a multiple disk failure for the following reason. For example, it is likely that a trouble frequently occurs in a copy source disk drive and a READ operation cannot be continued during a copying operation for carrying out dynamic sparing. In this case, the disk drive is blocked, and a data recovery operation (correction copy) is carried out for a parity group (i.e., ECC (error correcting code) group) to which the disk drive belongs. However, it is likely that a problem, such as a partial sector fault or hard disk blocking, will occur in another disk drive in the identical parity group during this correction copy operation. If such a multiple disk failure occurs, data will be lost.

SUMMARY OF THE INVENTION

It is an object of the present invention to reduce the risk of data loss due to a multiple failure of disks in a disk array device with a RAID constitution having spare disks.

It is another object of the present invention to provide a disk array device which is capable of performing high-speed dynamic sparing even at the time of high load.

A disk array device, which can be connected to a host device so that the devices are capable of communicating with each other, in accordance with one aspect of the present invention includes: a disk array control unit which performs control of the entire disk array device; a host side data transfer control unit which controls data transfer to and from the host device; a disk array including at least plural data disk drives which constitute, one parity group and one or more spare disk drives, wherein the one parity group has a large number of data stripes which are formed over storage areas of the plural data disk drives and the large number of data stripes can be partitioned into two or more sets of data stripes; a cache memory which is used for temporary storage of data to be transferred between the host device and the disk array; and a subordinate side transfer control unit which controls data transfer to and from the disk array.

Further, the disk array control unit has a prediction section which predicts the likelihood of occurrence of a failure for each data disk drive and a divided data copy section which selects two or more data disk drives out of the plural data disk drives as objects of divided data copy according to the predicted likelihood of occurrence of a failure, selects two or more divided storage areas by selecting one divided storage area from each of the selected two or more data disk drives, the selected two or more divided storage areas belonging to different sets of the data stripes in the parity group, and controls the subordinate side transfer control unit and the cache memory so as to copy data in the selected two or more divided storage areas to the one or more spare disk drives.

In one embodiment, the disk array control unit further includes, a dynamic sparing section which selects one data disk drive as an object of dynamic sparing out of the plural data disk drives according to the predicted likelihood of occurrence of a failure, selects the remaining divided storage areas, from which data has not been copied by the divided data copy section, from the selected one data disk drive, and controls the subordinate side transfer control units and the cache memory so as to copy data in the selected remaining divided storage areas to the spare disk drives.

In one embodiment, in the case in which the predicted likelihood of occurrence of a failure of a first data disk drive in the plural data disk drives has reached a first level, the divided data copy section selects at least the first data disk drive and a separate second data disk drive as objects of the divided data copy function. In the case in which the predicted likelihood of occurrence of a failure of the first data disk drive has reached a second level, which is higher than the first level, the dynamic sparing section selects the first data disk drive as an object of the dynamic sparing.

In one embodiment, in the case in which the predicted likelihood of occurrence of a failure of the first disk drive among the plural data disk drives has reached a predetermined level, the divided data copy section selects the first data disk drive and a second data disk drive, which has the largest predicted likelihood of occurrence of a failure after the first data disk drive, as objects of the divided data copy function.

In one embodiment, the divided data copy section controls the subordinate side transfer control unit and the cache memory so as to read out data simultaneously from the selected two or more divided storage areas in the course of copying the data in the selected two or more divided storage areas.

In one embodiment, the disk array control unit further includes a spare data updating section which, in the case in which a new request for writing data in the selected two or more divided storage areas from the host device is received from the host side data transfer unit after the data in the selected two or more divided storage areas is started to be copied to the one or more spare disk drives, controls the subordinate side transfer control unit and the cache memory so as to write the new data received from the host device in the selected two or more divided storage areas and to write the data in the spare disk drives as well.

In one embodiment, the divided data copy section selects first and second data disk drives as objects of the divided data copy from the plural data disk drives, selects a first divided storage area belonging to a set of front side data stripes in the parity groups from the first data disk drive, selects a second divided storage area belonging to a set of rear side data stripes following the set of front side data stripes from the second data disk drive, and controls the subordinate side transfer control unit and the cache memory so as to copy data in the first and the second divided storage areas to the spare disk drives.

In one embodiment, the two or more divided storage areas selected from the two or more data disk drives have substantially the same size.

In one embodiment, the two or more divided storage areas selected from the two or more data disk drives have different sizes according to the predicted likelihood of occurrence of a failure of the two or more data disk drives.

In one embodiment, the prediction section stores an error occurrence history for each of the data disk drives and predicts the likelihood of occurrence of a failure for each of the data disk drives on the basis of the stored error occurrence history.

A data sparing method in accordance with another aspect of the present invention is applied to a disk array device, which can be connected to a host device so as to be capable of communicating with each other, including: a disk array control unit which performs control of the entire disk array device; a host side data transfer control unit which controls data transfer to and from the host device; a disk array including at least plural data disk drives which constitute one parity group and one or more spare disk drives, wherein the one parity group has a large number of data stripes which are formed over storage areas of the plural data disk drives, and the large number of data stripes can be partitioned into two or more sets of the data stripes; a cache memory which is used for temporary storage of data to be transferred between the host device and the disk array; and a subordinate side transfer control unit which controls data transfer to and from the disk array. This method includes: a step of predicting the likelihood of occurrence of a failure for each of the disk drives; a step of selecting two or more data disk drives as objects of divided data copy out of the plural data disk drives according to the predicted likelihood of occurrence of a failure; a step of selecting two or more divided storage areas by selecting one divided storage area from each of the selected two or more data disk drives, wherein the selected two or more divided storage areas belong to different sets of data stripes in the parity group; and a step of performing the divided data copy by controlling the subordinate side transfer control unit and the cache memory so as to copy data of the selected two or more divided storage areas to the one or more spare disk drives.

One embodiment of this method further includes: a step of selecting one data disk drive as an object of dynamic sparing out of the plural data disk drives according to the predicted likelihood of occurrence of a failure; and a step of selecting the remaining divided storage areas, from which data has not been copied to the spare disks, from the selected one data disk drive, and controlling the subordinate side transfer control units and the cache memory so as to copy data in the selected remaining divided storage areas to the spare disk drives.

In one embodiment, the step of selecting two or more data disk drives is performed in the case in which the predicted likelihood of occurrence of a failure of a first data disk drive among the plural data disk drives has reached a first level, and then at least the first data disk drive and a separate second data disk drive are selected as objects of the divided data copy function. In addition, the step of selecting one data disk drive is performed in the case in which the predicted likelihood of occurrence of a failure of the first data disk drive has reached a second level higher than the first level, and then the first data disk drive is selected as an object of the dynamic sparing.

A data sparing control device in accordance with yet another aspect of the present invention is applied to a disk array device, which can be connected to a host device so that the devices are capable of communicating with each other, including: a disk array control unit which performs control of the entire disk array device; a host side data transfer control unit which controls data transfer to and from the host device; a disk array including at least plural data disk drives which constitute one parity group and one or more spare disk drives, wherein the one parity group has a large number of data stripes which are formed over storage areas of the plural data disk drives and the large number of data stripes can be partitioned into two or more sets of the data stripes; a cache memory which is used for temporary storage of data to be transferred between the host device and the disk array; and a subordinate side transfer control unit which controls data transfer to and from the disk array. This data sparing control device includes: a prediction unit which predicts the likelihood of occurrence of a failure for each of the data disk drives; a divided area selection unit which selects two or more data disk drives as objects of divided data copy out of the plural data disk drives according to the predicted likelihood of occurrence of a failure and selects two or more divided storage areas by selecting one divided storage area from each of the selected two or more data disk drives, wherein the selected two or more divided storage areas belong to different sets of data stripes in the parity group; and a divided data copy unit which controls the subordinate side transfer control unit and the cache memory so as to copy data of the selected two or more divided storage areas to the spare disk drives.

Other characteristics of the present invention will become evident from the following descriptions of various embodiments.

DESCRIPTION OF THE PREFERRED EMBODIMENT

An embodiment of a disk array device in accordance with the present invention will be described hereinafter.

Figure 1:
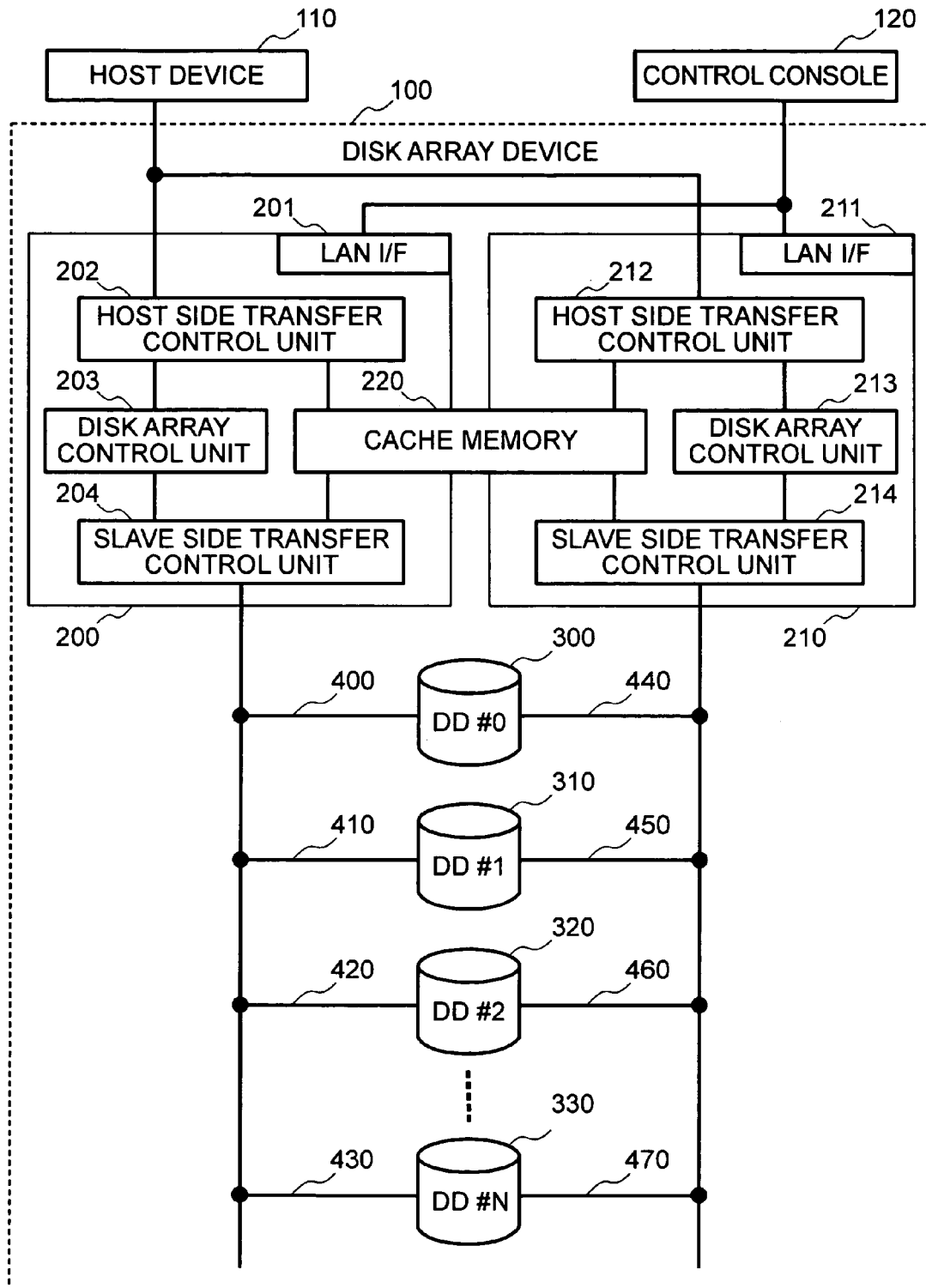
FIG. 1 is a block diagram of a computer system, which uses a disk array device in accordance with an embodiment of the present invention, showing an internal structure of this disk array device.

FIG. 1 shows a computer system, which uses a disk array device in accordance with an embodiment of the present invention, and the internal structure of this disk array device.

As shown in FIG. 1, a disk array device 100 is connected to a host device 110, such as a host computer, and includes plural hard disk drives (drive numbers #0 to #N) 300 to 330 and one or two or more controllers 200 and 210. In addition, this disk array device 100 includes a control console 120 for carrying out the operation and setting of the disk array device 100. The controllers 200 and 210 are connected to the control console 120 via LAN interfaces 201 and 211, respectively.

The controllers 200 and 210 respectively include: host side data transfer control units 202 and 212 which control data transfer to and from the host device 110; disk array control units 203 and 213 which perform control of the entire disk array device 100; a cache memory 220 which is used for data transfer or the like of the host device 100 and the disk drives 330 to 330; and subordinate side transfer control units 204 and 214, which control data transfer of the disk drives 300 to 330, respectively The controller 200 accesses the disk drives 300 to 330 via ports 400 to 430, respectively. The controller 210 accesses the disk drives 300 to 330 via ports 440 to 470, respectively. In the following description of this embodiment, a physical array of the plural disk drives 300 to 330 is referred to as a "disk array", and a logic volume with a redundant constitution according to the RAID technique is referred to as a "LU (logic unit)".

Figure 2:
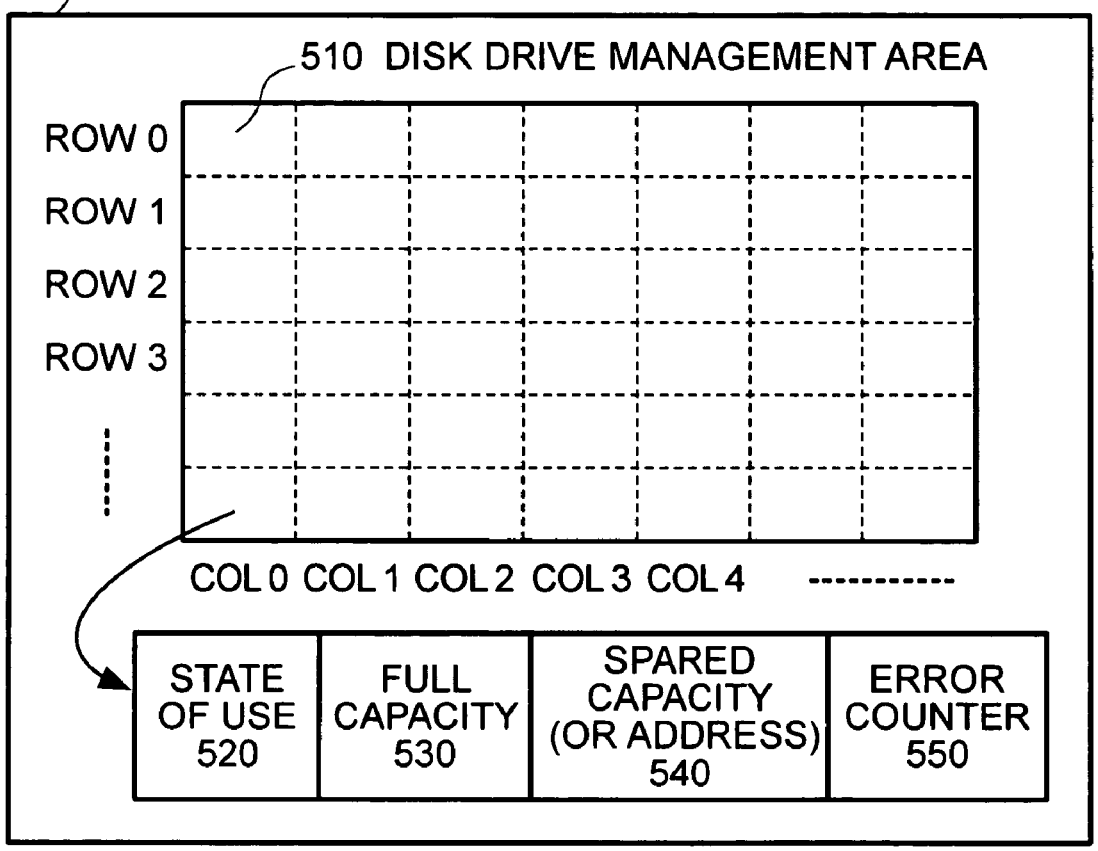
FIG. 2 is a diagram showing the configuration of a disk drive resource information table.
Figure 3:
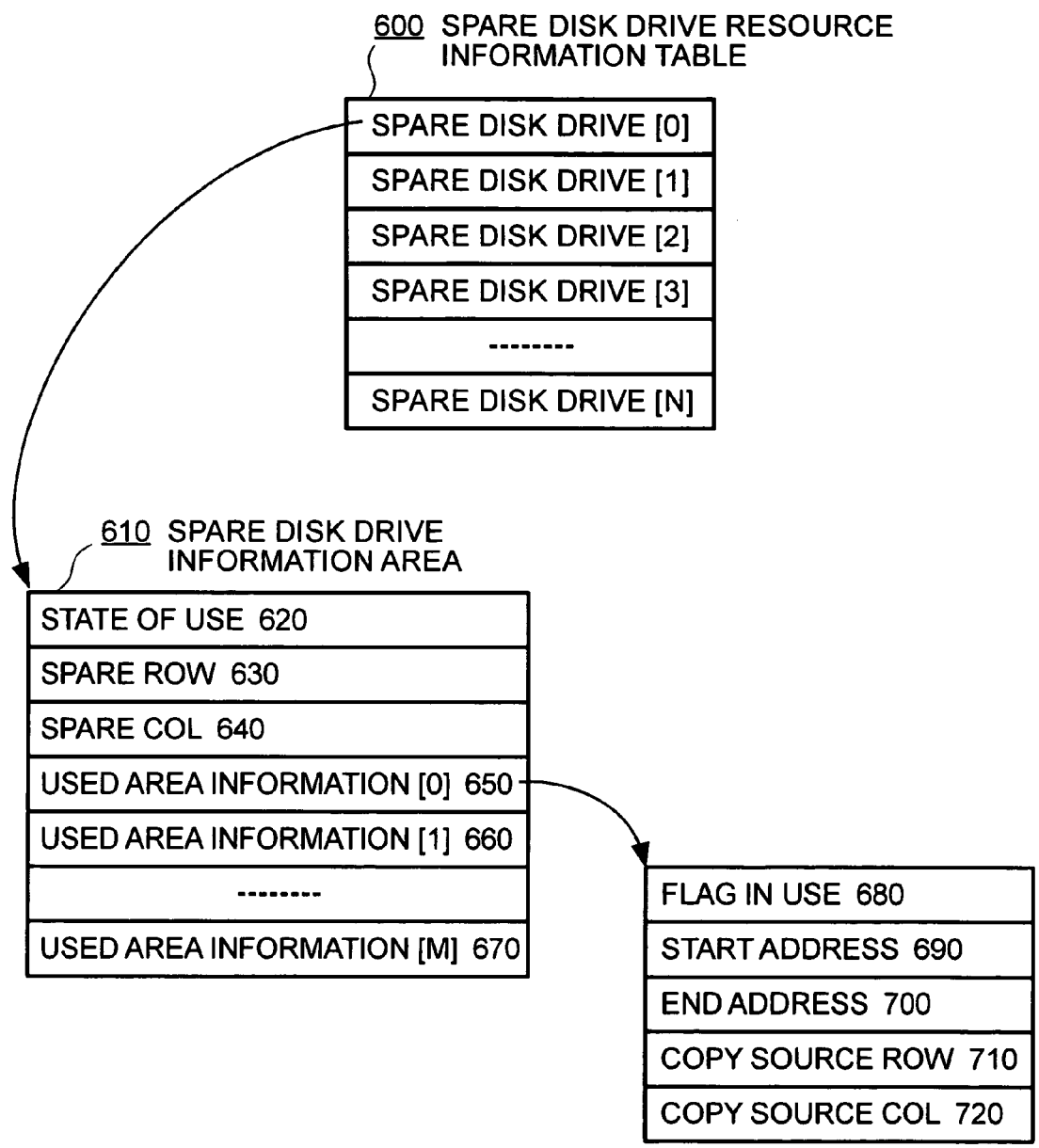
FIG. 3 is a diagram showing the configuration of a spare disk drive resource information table.

Next, with reference to FIGS. 2 and 3, a data structure for managing the state of a disk array used by the disk array device 100 of the present invention will be described. FIG. 2 is a diagram illustrating a disk drive resource information table 500. FIG. 3 is a diagram illustrating a spare disk drive resource information table 600.

The disk drive resource information table 500 shown in FIG. 2 exists in each of the disk array control units 203 and 213 of the controllers 200 and 210. The disk drive resource information table 500 is a table for managing the state of use, the capacity, and the like of all of the disk drives 300 to 330, and it includes plural disk drive management areas 510 corresponding to all the disk drives 300 to 330, respectively. A ROW (row) number (ROW #0, ROW #1, ... ) and a COL (column) number (COL #0, COL #1, ... ) allocated to each disk drive management area 510 indicate a position of a disk drive, which corresponds to the disk drive management area 510, in the disk array device 100.

Each disk drive management area 510 has information fields, such as the state of use 520, the full capacity 530, the spared capacity (or address) 540, and an error counter 550 with respect to the corresponding disk drive. Values indicating a situation of implementation and a situation of use for the corresponding disk drive, for example, four values of "uninstalled" and "installed" (which also distinguish whether the disk drive is used as a data disk drive or a spare disk drive), and "unused" and "used", are selectively entered in the state of use field 520. In a case in which the corresponding disk drive is implemented, a value representing a total storage capacity of the disk drive is entered in the full capacity field 530. The spared capacity (or address) field 540 is a field which is used at the time of copying data to the spare disk drives in the case in which the likelihood of occurrence of a failure of the corresponding disk drive has increased. A value indicating the capacity of data copied to the spare disk drives at a present point in the full capacity of the disk drive or an address (e.g., a logic block number, etc.) of a storage area from which the data is copied is entered in the spared capacity (or address) field 540. A value indicating the number of times of occurrence of an access error in the corresponding disk drive is entered in the error counter field 550. This value is counted up (or counted down) every time an access error occurs in the disk drive. The value of the error counter field 550 is used as a value representing an error rate (frequency of occurrence of an error), that is, a degree of likelihood of occurrence of a failure.

The spare disk drive resource information table 600 shown in FIG. 3 exists in each of the disk array control units 203 and 213 of the controllers 200 and 210. The spare disk drive resource information table 600 is a table that is used for managing the state of a disk drive, which is used as a spare disk drive, in the disk drives 300 to 330. The spare disk drive resource information table 600 has plural spare disk drive information areas 610 which correspond to all the spare disk drives, respectively.

Each spare disk drive information area 610 includes detailed information on a spare disk drive corresponding thereto, such as the state of use 620, a spare ROW 630, a spare COL 640, and used area information [0] 650 to [m] 670. The state of use field 620 selectively has a value indicating a state of use of the corresponding spare disk drive, for example, one of three values of "unused", "partially used", and "entirely used". In the case in which sparing of data of a certain data disk drive is performed, the state of use field 620 is used for performing a judgment on the propriety of use of the spare disk drive. A ROW number and a COL number indicating a position of the corresponding spare disk drive in the disk array device 100 are entered in the spare ROW field 630 and the spare COL field 640. The used area information [0] 650 to [ml 670 is provided in association with m storage areas ([0] to [m]) included in the corresponding spare disk drive (m is the number of divisions of the spare disk drive, which is 2 in the example shown in FIG. 4 to be described later), respectively, and this information is used for managing for data recovery of which disk drives the m storage areas have been used, respectively. Each piece of used area information has information, such as a flag in use 670, a start address 680, an end address 690, a copy source ROW 700, and a copy source COL 710. The flag in use 670 indicates whether or not a storage area corresponding thereto is currently being used. The start address 680 and the end address 690 indicate a start address and an end address of the corresponding storage area. A ROW number and a COL number, indicating a position of a data disk drive, in which data copied to the corresponding storage area was originally stored, in the disk array device 100, are entered in the copy source ROW 700 and the copy source COL 710.

The disk array control units 203 and 213 (see FIG. 1) of the disk array device 100 use the disk drive resource information table 500 and the spare disk drive resource information table 600, which are described above, to perform a control operation, as described below, in order to grasp the states of the disk drives 300 to 330 and to protect data from being lost due to a failure of the disk drives.

In the following description, as an example, the error rate (frequency of occurrence of an access error) of each disk drive is classified into three levels indicating the likelihood of occurrence of a failure of each disk drive. In other words, a "level 1", a "level 2", and a "level 3" indicate that a probability of occurrence of a failure is low, medium, and high, respectively. When an error rate of a certain disk drive is for example, the level 2, the disk array control units 203 and 213 perform "divided data copy to spare disks", which complies with the principle of the present invention, for the disk drive to prepare for the possible occurrence of a failure. Thereafter, when more errors occur in the disk drive and the error rate changes to, for example, the level 3, the disk array control units 203 and 213 carry out dynamic sparing for the disk drive. Then, after completion of the dynamic sparing, the disk array control units 203 and 213 block the particular disk drive.

Control for protecting data from being lost due to a failure of a disk drive will be more specifically described blow. In the following description, a case of a disk array which is constituted so as to form a parity group having a 3D+1P format in accordance with the RAID-5 technique will be considered as an example. However, those skilled in the art should easily understand that control complying with the principle of the present invention can be applied to a disk array having other structures in accordance with the RAID technique.

Figure 4:
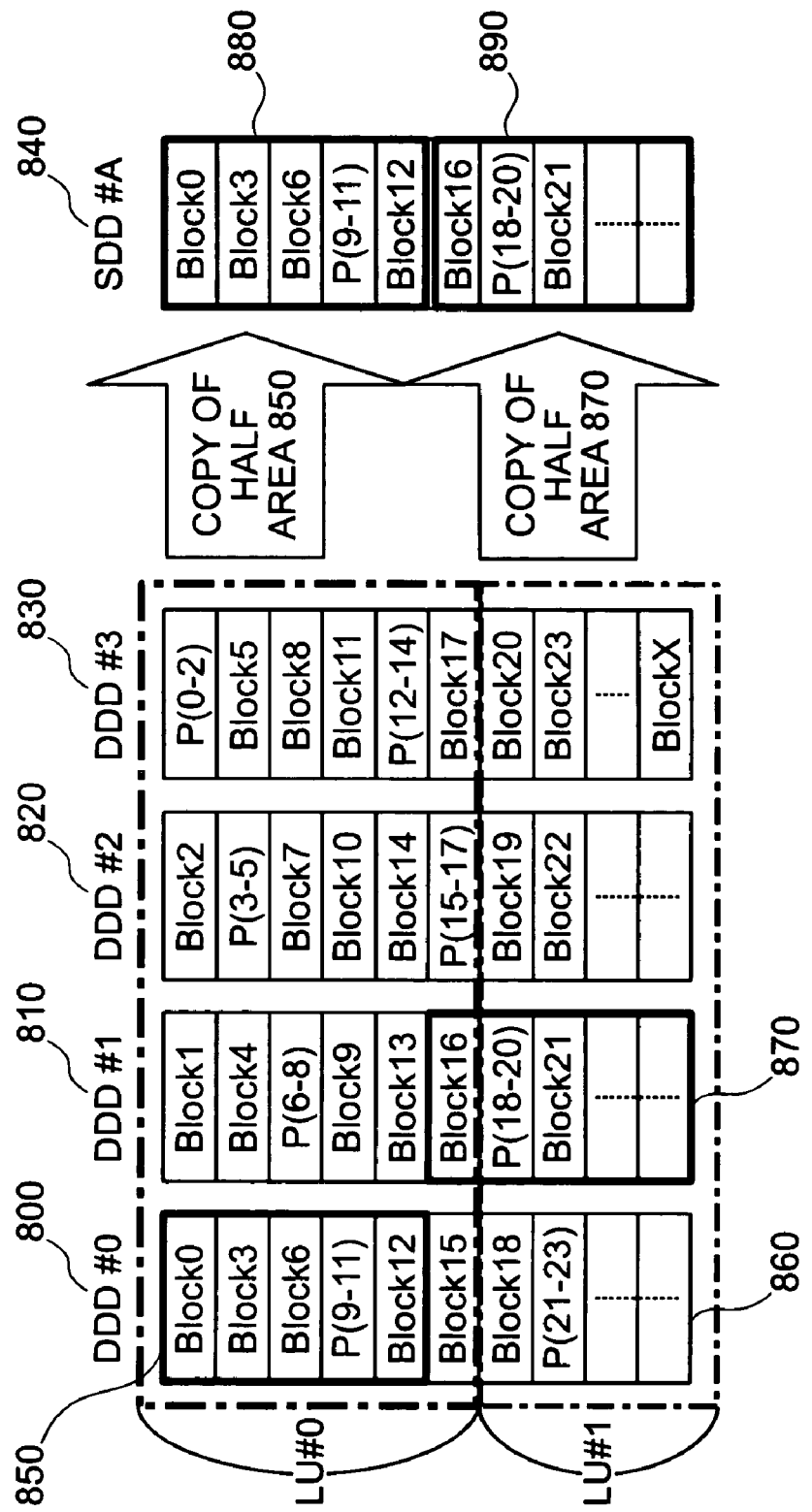
FIG. 4 is a diagram showing a disk array, which forms a parity group having a 3D+1P format, and illustrating a state of copying divided data to spare disk drives.

FIG. 4 shows an example of a structure of a disk array forming a parity group having the 3D+1P format.

In the example shown in FIG. 4, there is a disk array consisting of four data disk drives (DDD #0 to DDD #3) 800 to 830, which form one parity group having the 3D+1P format. In this data array 800 to 830, for example, two logic units LU0 and LU1 are defined. One logic unit LU0 is constituted by logic blocks Block 0 to Block 17, and the other logic unit LU1 is constituted by logic blocks Block 18 to Block X (the size of one logic block is, for example, 64K bytes). Four logic blocks arranged in one row in the horizontal direction in the figure, which are included in these four different data disk drives 800 to 830, respectively, form one data stripe having the 3D+1P format. Here, a logic block identified as P(Q–R) in each data stripe represents a block storing parity data for the data of the other logic blocks Block Q to Block R in the same data stripe. For example, a first data stripe is constituted by three data logic blocks, including Block 0 to Block 2, and one parity logic block P(0–2). A second data stripe is constituted by three data blocks, including Block 3 to Block 5, and one parity block P(3–5). In this way, there are a large number of data stripes in the disk array 800 to 830 forming one parity group. Moreover, at least one spare disk drive (SDD#A) exists other than the disk array 800 to 830.

Figure 5:
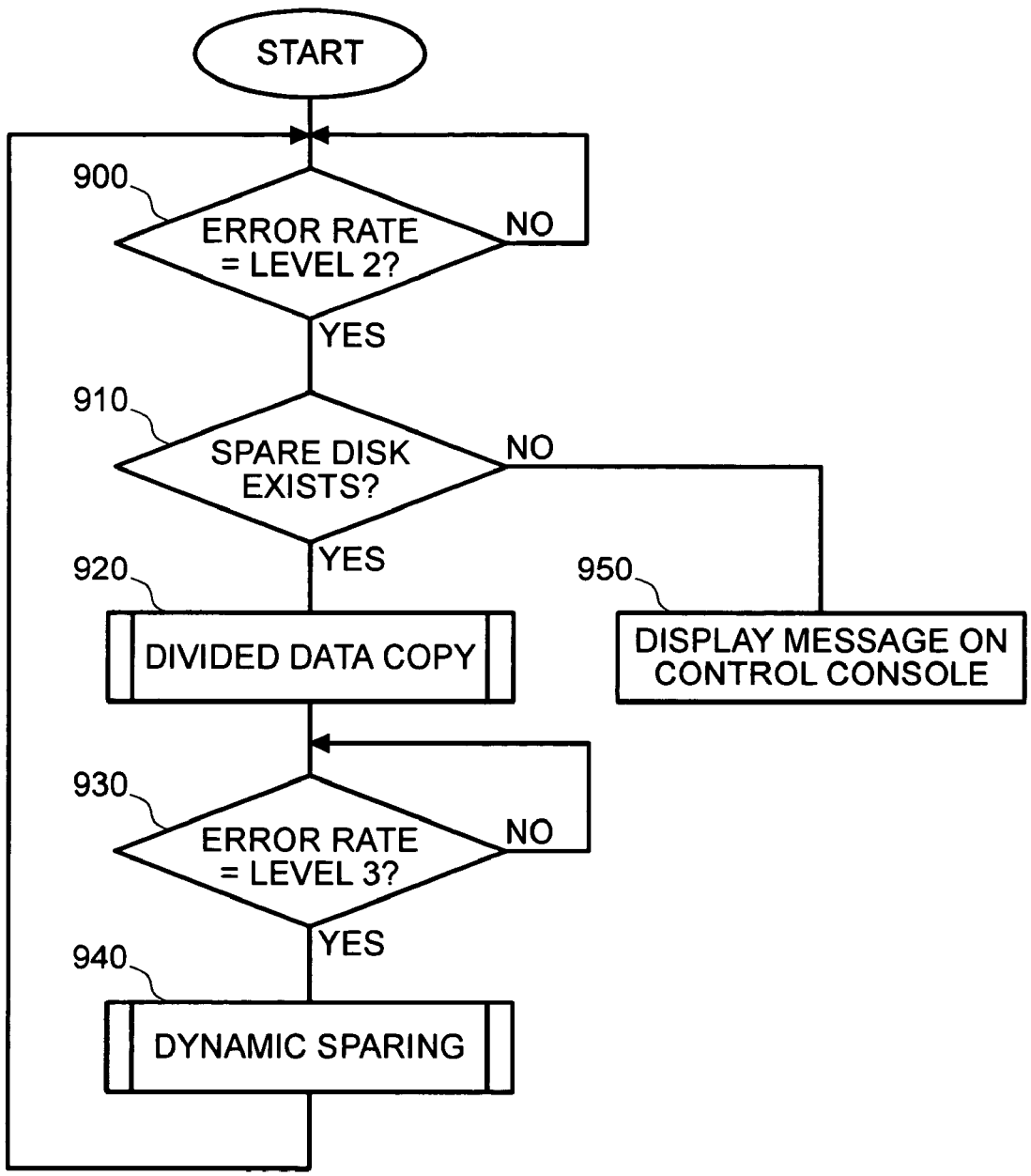
FIG. 5 is a flowchart showing the flow of a control operation for data protection of a disk array performed by disk array control units 203 and 213.

FIG. 5 shows an overall flow of control for protecting data from a failure of data disk drives performed by the data disk array control units 203 and 213 (see FIG. 1), which is applied to the disk array 800 to 830 having the structure illustrated in FIG. 4.

As shown in FIG. 5, the disk array control units 203 and 213 check whether or not there is a disk drive that has an error rate which has reached the level 2 in the disk array 800 to 830 (step 900). This check can be performed by finding the disk drive management area 510, in which the value of the error counter 550 has reached a predetermined threshold value corresponding to the level 2, from the disk drive resource information table 500 shown in FIG. 2. If such a disk drive management area 510 is found, the disk drive in the position determined by the ROW number and the COL number corresponding to the disk drive management area 510 is detected as a disk drive where error rate has reached the level 2. If such a disk drive is detected, the disk array control units 203 and 213 judge the presence or absence of an available spare disk drive with reference to the spare disk drive resource information table 600 shown in FIG. 3 (step 910). If there is an available spare disk, the disk array control units 203 and 213 control the subordinate side transfer control units 204 and 214 and the cache memory 220 to perform divided data copy processing for the detected disk drive (step 920). A specific method of performing divided data copy processing will be described later. On the other hand, if there is no available spare disk, the disk array control units 203 and 213 issue a warning informing the control console 110 of an increase in error rate of the disk drive to urge the operator to pay attention to this condition (step 950).

In addition, the disk array control units 203 and 213 check whether or not there is a disk drive having an error rate which has reached the level 3, in the disk array 800 to 830 (step 930). This check can be performed by finding the disk drive management area 510, in which a value of the error counter 550 has reached a predetermined threshold value corresponding to the level 3, from the disk drive resource information table 500 shown in FIG. 2. If such a disk drive management area 510 is found, the disk drive in the position determined by the ROW number and the COL number corresponding to the disk drive management area 510 is detected as a disk drive whose error rate has reached the level 3. If such a disk drive is detected, the disk array control units 203 and 213 control the subordinate side transfer control units 204 and 214 and the cache memory 220 to execute dynamic sparing for the detected disk drive (step 940). Here, as is evident from the above description, usually the divided data copy of step 920 has already been performed for a disk drive which has become an object of dynamic sparing. As is seen from specific processing for the divided data copy, which will be described later, data in a half of an entire storage area in the disk drive has already been copied to spare disk drives by the divided data copy. Therefore, in the dynamic sparing process, it is sufficient to copy data of the remaining half storage area to the spare disk drives. Thus, the time required for the dynamic sparing is reduced by half from that required in the past. After completion of the dynamic sparing, the disk drive is blocked, and work for replacing it with a normal disk drive is performed. Although not shown in FIG. 5, after completion of the replacement of the blocked disk drive, data is copied back (recovered) to the disk drive from a spare disk drive. After this data recovery is completed, the spare disk drive is set to a standby state and is used at the next opportunity for carrying out divided copy processing and dynamic sparing.

Next, a specific example of the divided data copy processing of step 920 in FIG. 5 will be described.

In FIG. 4, an example of a specific form of the divided data copy processing, which is executed in the disk array 800 to 830, is shown together with an example of the structure of the disk array 800 to 830, which has already been described. An example of the divided data copy processing will be described with reference to FIG. 4.

In the disk array 800 to 830 shown in FIG. 4, for example, it is assumed that one data disk drive (DDD #0) 800 has reached the level 2. At this point, it is assumed that the error rate of the other data disk drives (DDD #1 to #3) 810 to 830 is the level 1. However, it is assumed that a value of the error counter of the data disk drive (DDD #1) 810 is the highest among the data disk drives (DDD #1 to #3) 810 to 830 of the level 1. In addition, at this point, it is assumed that an available spare disk (SDD #A) 840 exists.

In such a situation, divided data copy processing is executed for the disk drive (DDD #0) 800, which has reached the level 2, before it breaks down and a READ operation becomes impossible. In this divided data copy processing, the storage area (logic blocks Block 0 to Block 12) 850 in the upper half in the figure (front half is selected out of all the storage areas of the disk drive (DDD #0) 800, and processing for copying data of the selected upper half storage area 850 to an upper half storage area 880, which corresponds to the upper half storage area 850, in the spare disk drive (SDD#A) 840 is executed. In other words, the data of the upper half storage area 850 is read out to the cache memory 220 by control of the subordinate side transfer control units 204 and 214, and this data is written in the corresponding upper half storage area 880 of the spare disk drive (SDD #A) from the cache memory 220. In parallel with this, another disk drive (DDD #1) 810 having the highest error count value (i.e., the highest likelihood of occurrence of a failure) after this disk drive (DDD #0) 800 is selected. A recording place area (Block 16, Block P(18–20), Block 21, . . . ) 870 of a lower half (rear half), which corresponds to a set of data stripes of a lower half (rear half) following a set of data stripes of an upper half (front half) to which a divided copy range (i.e., the upper half storage area 850) in the above-mentioned disk drive (DDD #0) 800 belongs, is selected from the selected disk drive (DDD #1) 810. Then, processing for copying data of the selected lower half recording place area (Block 16, Block P(18–20), Block 21, . . . ) 870 to a half storage area 890, which corresponds to the lower half recording place area 870, of the spare disk drive (SDD #A) 840 is executed. In other words, data of the lower half recording place area 870 is read out to the cache memory 220 by control of the subordinate side transfer control units 204 and 214, and this data is written in the corresponding half storage area 890 of the spare disk drive (SDD #A) 840 from the cache memory 220.

In short, in the divided data copy processing, the two disk drives (DDD #0, #1) 800 and 810, which have a relatively high likelihood of occurrence of a failure, are selected from the disk array 800 to 830 forming one parity group, and the upper half (front half) and the lower half (rear half storage areas 850 and 810, which belong to different sets of data stripes, are selected from the selected two disk drives (DDD #0, #1) 800 and 810, respectively. Then, data is simultaneously read from the selected upper half (front half and lower half (rear half) storage areas 850 and 870 and written in the spare disk 840. At this point, the data simultaneously read from the two disk drives (DDD #0, #1) 800 and 810 are scheduled by the disk array control units 203 and 213 and written in the spare disk drive 840. Thus, the time required for the data READ process is reduced by half by effecting a simultaneous data READ from the two disk drives. The reduction in copy time is particularly advantageous in a high load environment. Moreover, in the case in which the spare disk drive 840 has plural access ports, since multiple data WRITE processing to the spare disk drive 840 can be performed, the speed of the divided data copy processing is increased.

Note that, in the case in which a WRITE request for new data is inputted to a logic block, for which a copy process has already been completed, in the disk drives (DDD #0, #1) 800 and 810 as objects of copy processing from the host device 110 or the like through the host side data transfer control units 202 and 212 during execution of the divided data copy processing, the disk array control units 203 and 213 control the subordinate side transfer control unit 204 and the cache memory 220 to write the data duplicately to the disk drive (DDD #0 or #1) 800 or 810 and the spare disk drive (SDD #A) 840 as objects of the WRITE operation. Consequently, data in the spare disk drive (SDD #A) 840 can always be kept in an updated state in preparation for occurrence of a failure in. the copy source disk drives (DDD #0, #1) 800 and 810.

Figure 6:
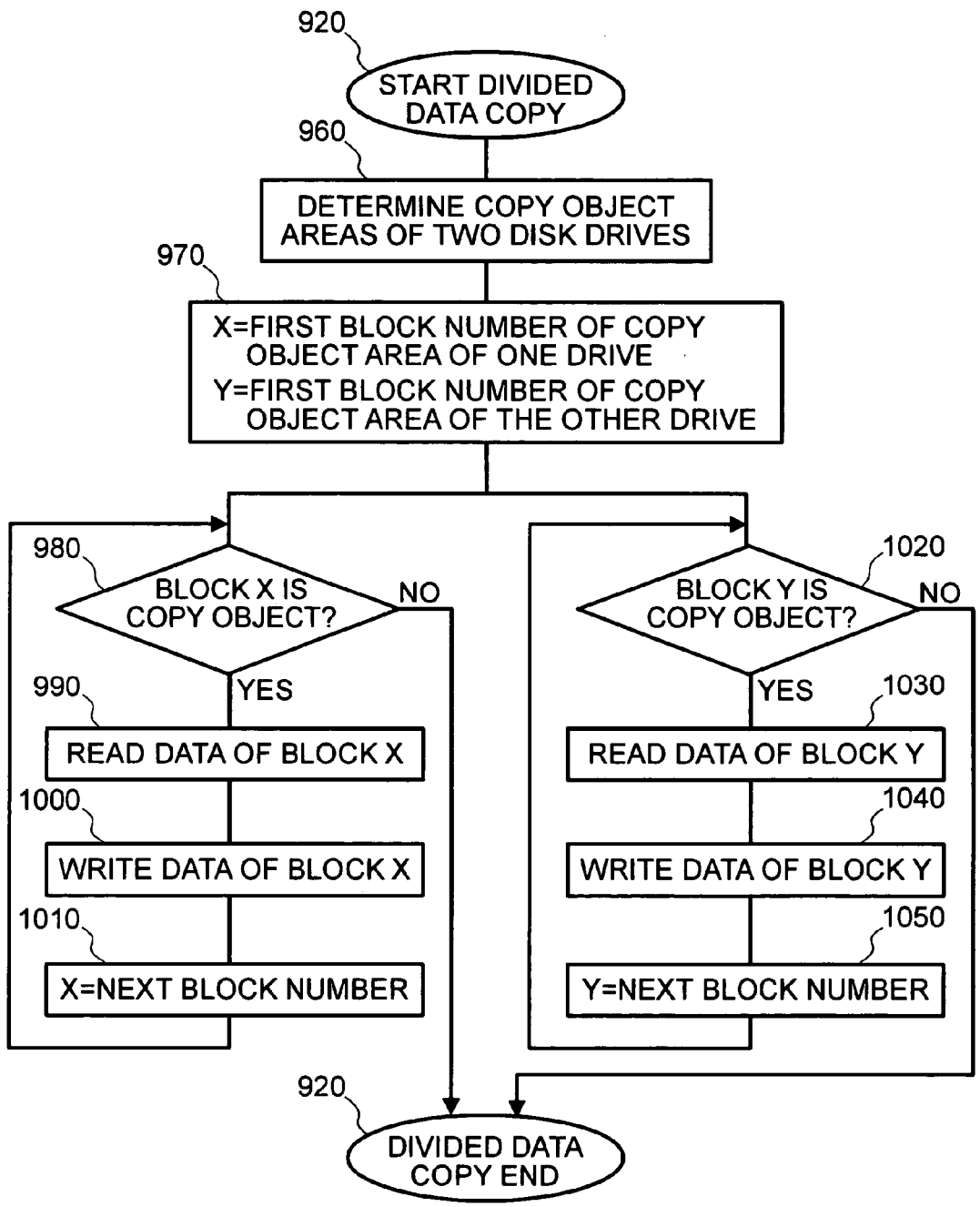
FIG. 6 is a flowchart showing a specific example of the flow of divided data copy processing.

FIG. 6 shows a specific example of the flow of the divided data copy processing.

As shown in FIG. 6, when the divided data copy processing is started, two storage areas, which are objects of divided data copy, are selected from a disk drive, including a storage area having an error rate which has reached the level 2 in one disk drive, and a storage area in another disk drive having the highest error rate (error count value) after this one disk drive (step 960). In the example of FIG. 4, the half storage areas 850 and 870 are selected from the disk drive (DDD #0 or #1) 800 or 810, respectively. Here, it is important that the selected two storage areas 850 and 870 do not overlap in a set of data stripes to which the storage areas belong. In other words, all logic blocks selected as objects of copy belong to different sets of data stripes, respectively. Consequently, it becomes more likely that data in as many number as possible are protected.

Thereafter, data is sequentially read in parallel from all logic blocks in copy object areas of the two respective disk drives, and the read data is written in logic blocks, which correspond to the logic blocks in the copy object areas, of spare disk drives in accordance with a predetermined schedule (in a loop of step 970 and steps 990 to 1010 for one drive, and a loop of step 970 and steps 1020 to 1050 for the other drive).

Figure 7:
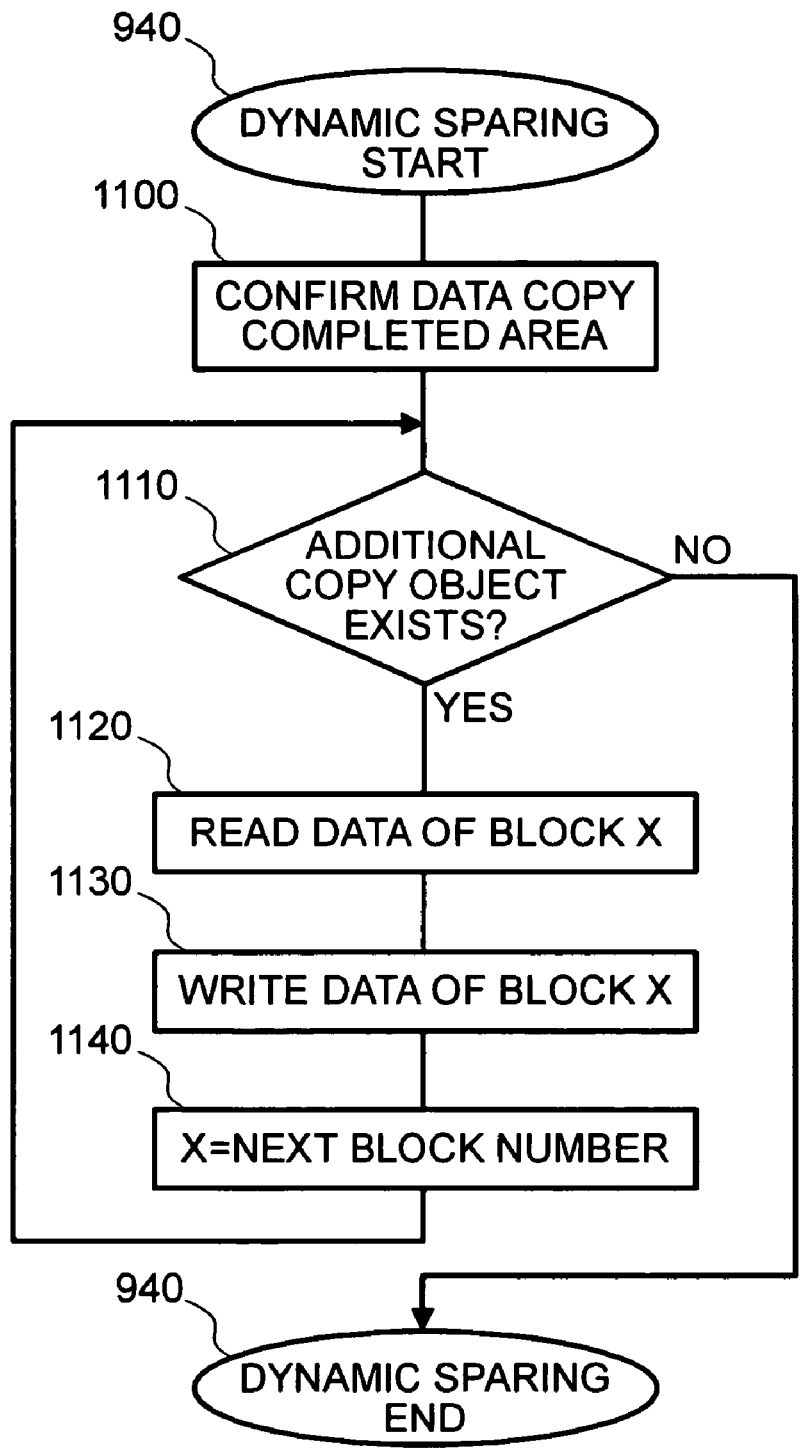
FIG. 7 is a flowchart showing a specific example of the flow of dynamic sparing processing.

FIG. 7 shows a specific flow of the dynamic sparing processing applied to a disk drive, the error rate of which has reached the level 3.

As shown in FIG. 7, when the dynamic sparing is started, it is confirmed by the disk array control unit 203 or 213 which storage area in a disk drive, which becomes an object of the processing, is a storage area for which sparing (copy to a spare disk) has already been completed (step 1100). This confirmation can be performed by referring to the spared capacity (or address) 540 of the disk drive management area 510 corresponding to the disk drive in the disk drive resource information table 500 shown in FIG. 2. Usually, since the divided data copy processing has already been performed to the disk drive, sparing has already been completed for a half storage area in the disk drive. Thereafter, data of a storage area, for which sparing has not been completed yet, in the disk drive is sequentially read out to the cache memory 220 through the subordinate side transfer control unit 204 or 214 in an order of the block numbers by control of the disk array control unit 203 or 213, and the data is copied to a storage area, which corresponds to the above-mentioned storage area, of a spare disk drive from the cache memory 220 through the subordinate side transfer control unit 204 or 214 (a loop of steps 1110 to 1140).

Note that, in the case in which a disk drive which sends as an object of the dynamic sparing breaks down and a data READ operation cannot be performed before the dynamic sparing is completed, the data to be read is recovered and copied to the spare disk drive by a correction copy operation using data in another disk drive constituting the same parity group as the data to be read. In the case in which the above-mentioned other disk drive also breaks down and a data READ operation cannot be performed before this correction copy operation is completed, according to the related art, a sub-system relating to these broken-down disk drives cannot help but lapse into a system down state. However, in this embodiment, since the divided data copy has already been performed for the broken-down other disk drive, even if duplicate failures occur, as described above, the data as an object of a correction copy can be recovered using the data in the spare disk drive.

Next, a specific example of the above-mentioned control operation for data protection in the case in which two spare disk drives are prepared for four data disk drives, which constitute a disk array of the 3D+1P format, will be described with reference to FIGS. 8A to 8C.

Figure 8:
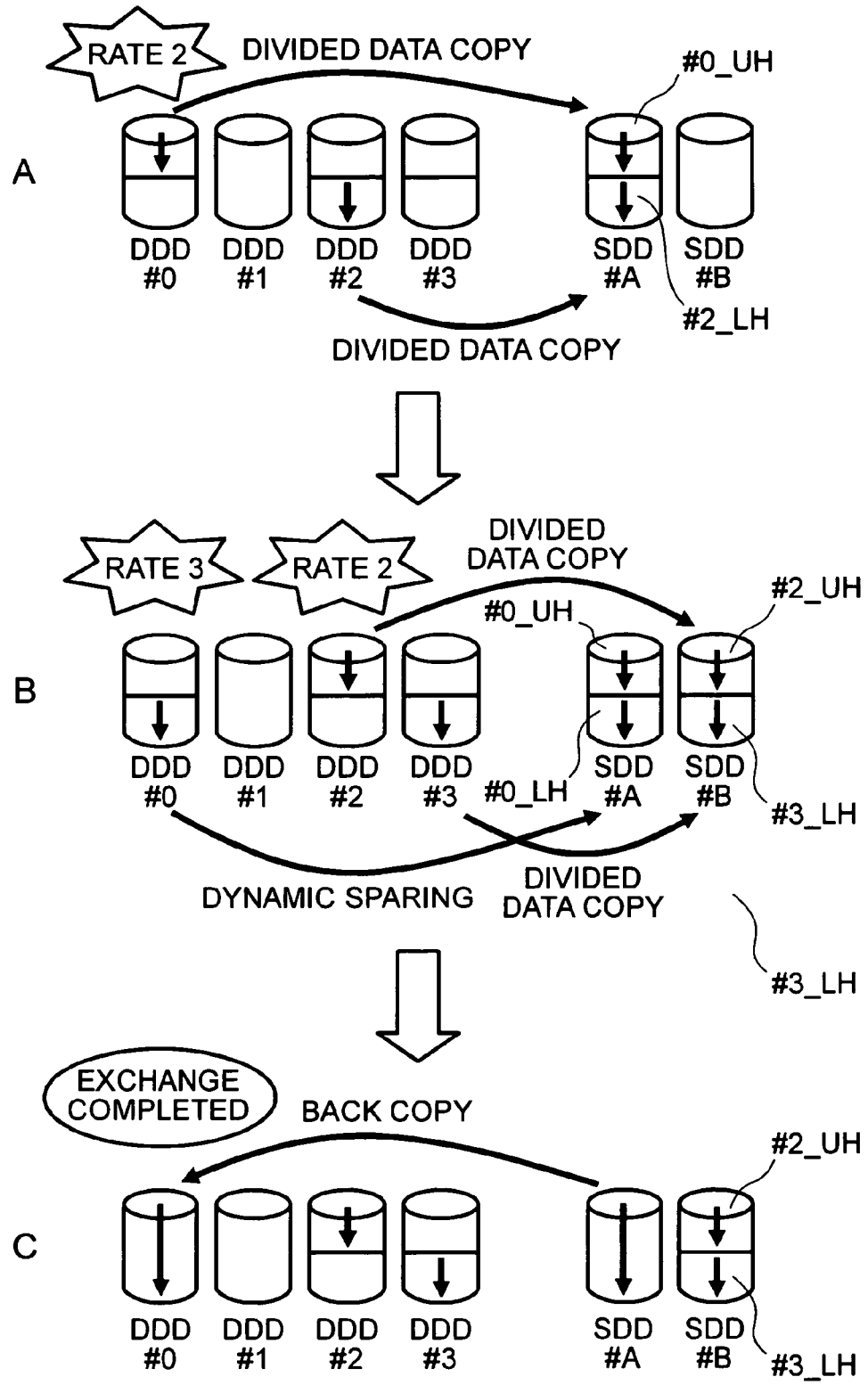
FIGS. 8A to 8C are diagrams showing a specific example of a control operation for data protection in a case in which two spare disk drives are prepared for four data disk drives constituting a disk array having a 3D+1P format.

As shown in FIG. 8A, in the four data disk drives DDD #0 to #3 constituting the disk array of 3D+1, in the case in which the error rate of the disk drive DDD #0 has reached the level 2 and the error rates of the other disk drives DDD #1 to #3 are at the level 1 (#2>#3>#1), the divided data copy processing for copying divided data to the spare disk drive SDD #A is executed for the disk drive DDD #0 having the error rate of the level 2 and the disk drive DDD #2 having the second highest error rate. In other words, data #0_UH of the upper half (front half) of the disk drive DDD #0 and data #2_LH of the lower half (rear half) of the disk drive DDD #2 are copied to the spare disk drive SDD #A.

Thereafter, as shown in FIG. 8B, in the case in which the error rate of the disk drive DDD #0 has increased to reach the level 3, the dynamic sparing processing for copying data to the spare disk drive SDD #A is executed for the disk drive DDD #0 before the disk drive DDD #0 becomes unreadable. In the dynamic sparing processing, it is sufficient to only copy data #0_LH of the lower half (rear half, which has not been spared, of the disk drive DDD #0 to the spare disk drive SDD #A. At this point, data #2_LH of the lower half (rear half) of the disk drive DDD #2 in the spare disk drive SDD #A is deleted. At this point, in the case in which the error rate of the disk drive DDD #2 has reached the level 2 as well, the divided data copy is executed, and data #2_UH of the upper half (front half) of the disk drive DDD #2 and data #3_LH of the lower half (rear half) of the disk drive DDD #3 having the second highest error rate are copied to another spare disk drive SDD #8.

After completion of the dynamic sparing processing for the disk drive DDD #0, the disk drive DDD #0 is blocked and is replaced with a separate normal disk drive. The divided data copy processing disk drives DDD #2 and DDD #3 are used even after the divided data copy processing is completed as usual as long as error rates thereof do not reach the level 3. However, when a data WRITE operation to the disk drive DDD #2 or DDD #3 is performed, the same data is duplicately written to the spare disk drive SDD #8 as well as the disk drive DDD #2 or DDD #3, whereby data in the spare disk drive SDD #B is always kept updated.

After the replacement of the disk drive DDD #0 is completed, as shown in Fig. BC, data is copied from the spare disk drive SDD #A to the disk drive DDD #0, and the data of the disk drive DDD #0 is recovered. After this recovery processing is completed, the spare disk drive SDD #A comes into the standby state. At this stage, the data of the spare disk drive SDD #B is continuously kept in the updated state and is prepared for a future increase in error rate of the disk drives DDD #2 and DDD #3.

Figure 9:
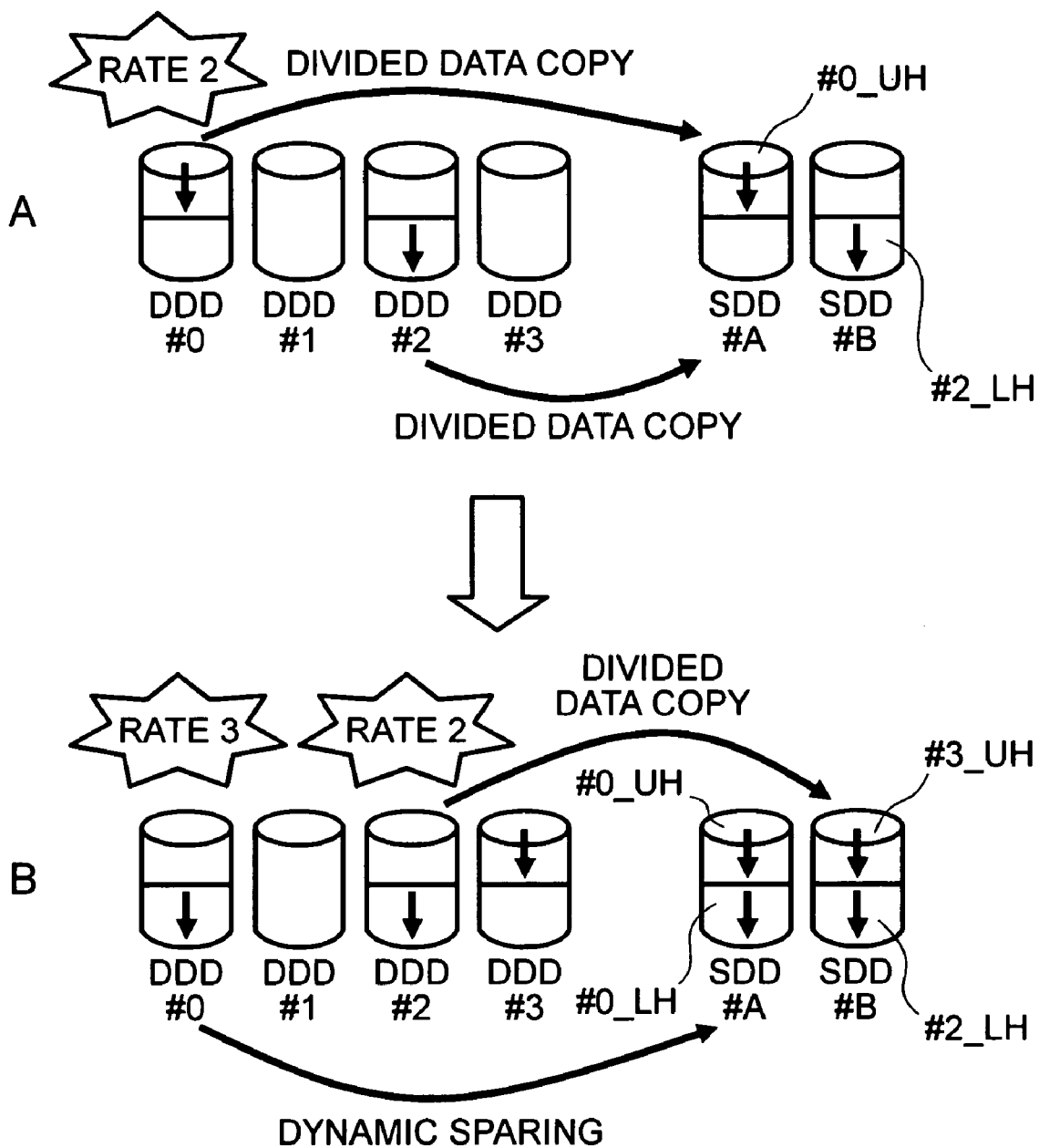
FIGS. 9A and 9B are diagrams showing a modification of a data copy operation shown in FIGS. 8A to 8C.

FIGS. 9A and 9E show a modification of the data copy operation shown in FIGS. 8A to 8C.

In the above-mentioned data copy operation of FIGS. 8A to 8C, in the divided data copy processing shown in FIG. 8A, the data #0_UH and #2_LH of the two disk drives DDD #0 and DDD #2 are copied to the identical spare disk drive SDD #A. However, as a modification, it is also possible to copy the data #0_UH and #2_LH of the two disk drives DDD #0 and DDD #2 to different spare disk drives SDD #A and SDD #B, respectively, as shown in FIG. 9A. In this way, thereafter, in the case in which an error rate of the disk drive DDD #0 has reached the level 3 and the dynamic sparing processing is performed as shown in FIG. 9B, it is possible to copy the remaining data #0_LH of the disk drive DDD #0 to the spare disk drive SDD #A without deleting the data #2_LH of the disk drive DDD #2 which has already been spared. As a result, in the case in which the error rate of the disk drive DDD #2 has reached the level 2 and the divided data copy processing is performed, it is necessary to copy only the data #3_UH of the disk drive DDD #3 having the second highest error rate without copying the spared data #2_LH of the disk drive DDD #2.

Figure 10:
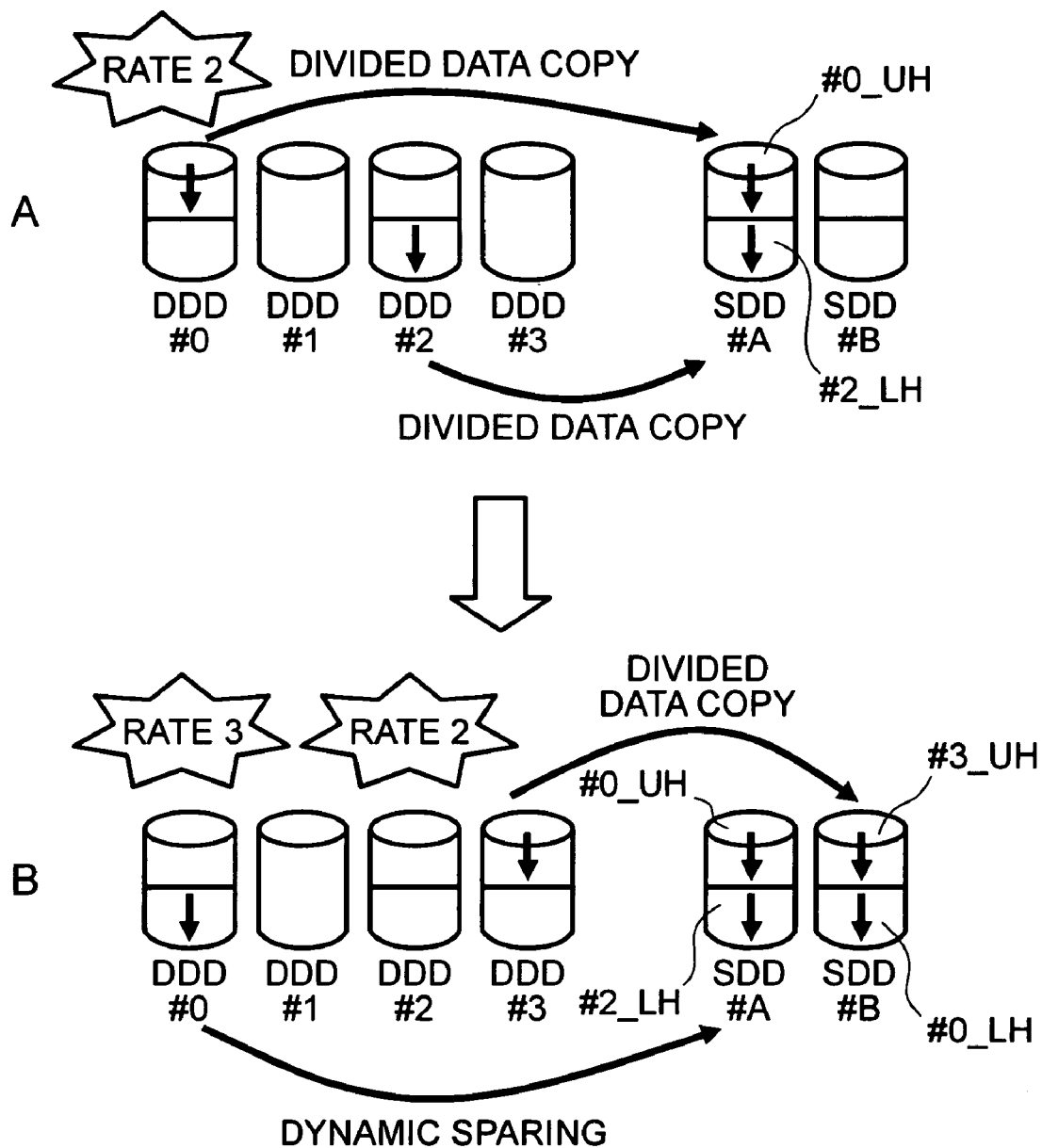
FIGS. 10A and 10B are diagrams showing another modification of the data copy operation shown in FIGS. 8A to 8C.

FIGS. 10A and 10B show another modification of the data copy operation shown in FIGS. 8A to 8C.

Operations of the divided data copy processing shown in FIG. 10A are the same as those shown in FIG. 8A. However, in the dynamic sparing processing of the disk drive DDD #0 shown in FIG. 10B, the data #0_LH of the lower half (rear half) of the disk drive DDD #0 is copied to the spare disk drive SDD #B separate from the spare disk drive SDD #A to which the data #0_UH of the upper half (rear half) is copied. Consequently, the data #2_LH of the disk drive DDD #2, which has already been spared, does not have to be deleted. As a result, as in the example of operations of FIGS. 9A and 9B, in the case in which the error rate of the disk drive DDD #2 has reached the level 2 and the divided data copy processing is performed, it is necessary to copy only the data #3_UH of the disk drive DDD #3 having the second highest error rate without copying the spared data #2_LH of the disk drive DDD #2.

Figure 11:
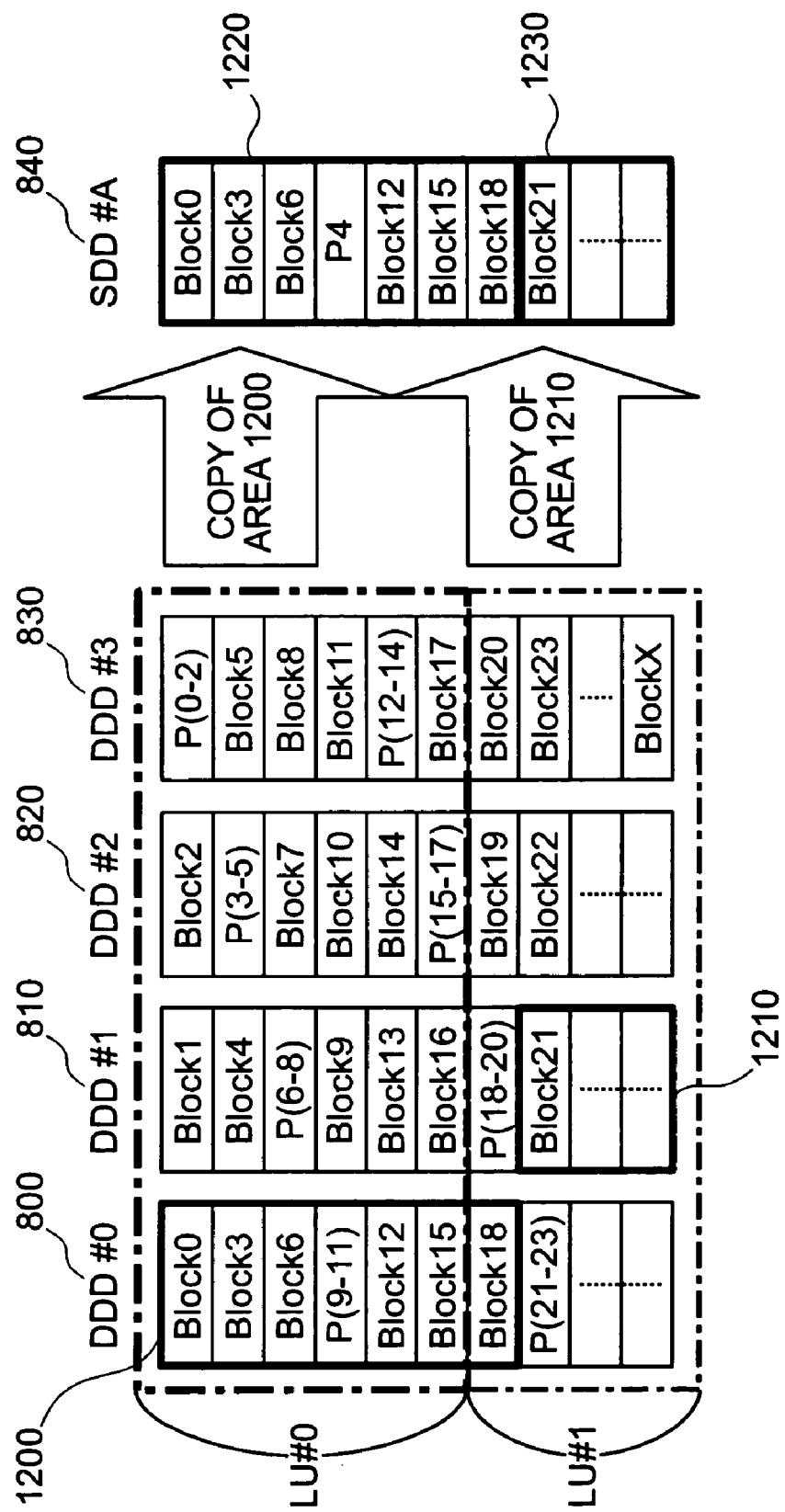
FIG. 11 is a diagram showing a modification of the divided data copy processing.

FIG. 11 shows a modification of the operation of the divided data copy processing shown in FIG. 4.

In the divided data copy processing shown in FIG. 4, the storage areas 805 and 807 having substantially equal sizes (i.e., a half size) are selected from the two disk drives DDD #0 and DDD #1, respectively, to perform sparing of that data. As a modification, as shown in FIG. 11, it is also possible to select storage areas 1200 and 1210 having unequal sizes from the two disk drives DDD #0 and DDD #1 to perform sparing of that data. In the example of FIG. 11, the storage area 1200 of the larger size is copied from the disk drive DDD #0 with a higher error rate (likelihood of occurrence of a failure), and the storage area 1210 of the smaller size is copied from the disk drive DDD #1 with a lower error rate.

According to such unequal divided data copy processing, the effect of a reduction in the time required for the divided data copy is low compared with the equal divided data copy processing shown in FIG. 4. However, an effect that the processing time can be reduced in the dynamic sparing processing to be performed later (which is highly likely for the disk drive DDD #0 with the higher error rate) can be expected.

Figure 12:
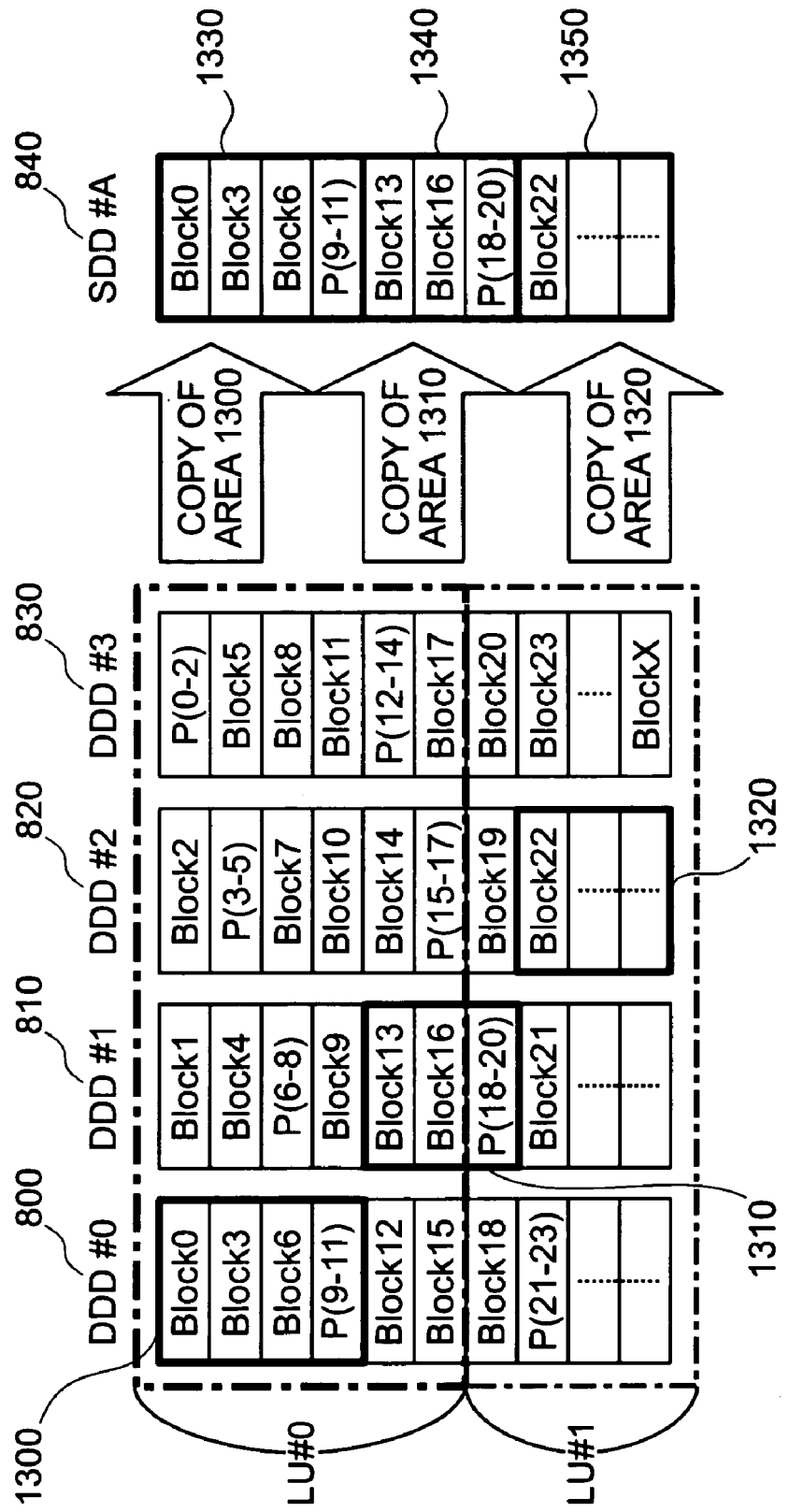
FIG. 12 is a diagram showing another modification of the divided data copy processing.

FIG. 12 shows another modification of the operations of the divided data copy processing shown in FIG. 4.

In the divided data copy processing shown in FIG. 4, the two disk drives DDD #0 and DDD #1 are selected as objects of processing. As a modification, as shown in FIG. 12, three or more disk drives DDD #0, DDD #1, DDD #2, and the like may be selected as objects of the divided data copy processing. In the example of FIG. 12, the three disk drives DDD #0, DDD #1, and DDD #2 are selected in order from the one with the highest error rate, and three storage areas 1300, 1310, and 1320 of parity groups which do not overlap each other are selected and copied, respectively.

Various embodiments of the present invention have been described. However, these embodiments represents only examples used for the description of the present invention, and it is not intended to limit the scope of the present invention only to these embodiments. The present invention can be carried out in various other forms without departing from the gist thereof.

For example, in the above-mentioned embodiments, the error rate is classified into three levels, and the divided data copy operation is performed for a drive of the level 2 and the dynamic sparing is performed for a drive of the level 3. However, it is also possible to classify the error rate into more than three levels and, for drives of intermediate plural levels (e.g., the levels 2 and 3 among the four levels), to perform the divided data copy corresponding to the levels (e.g., as the level is higher, the data size to be spared increases).

Figure 13:
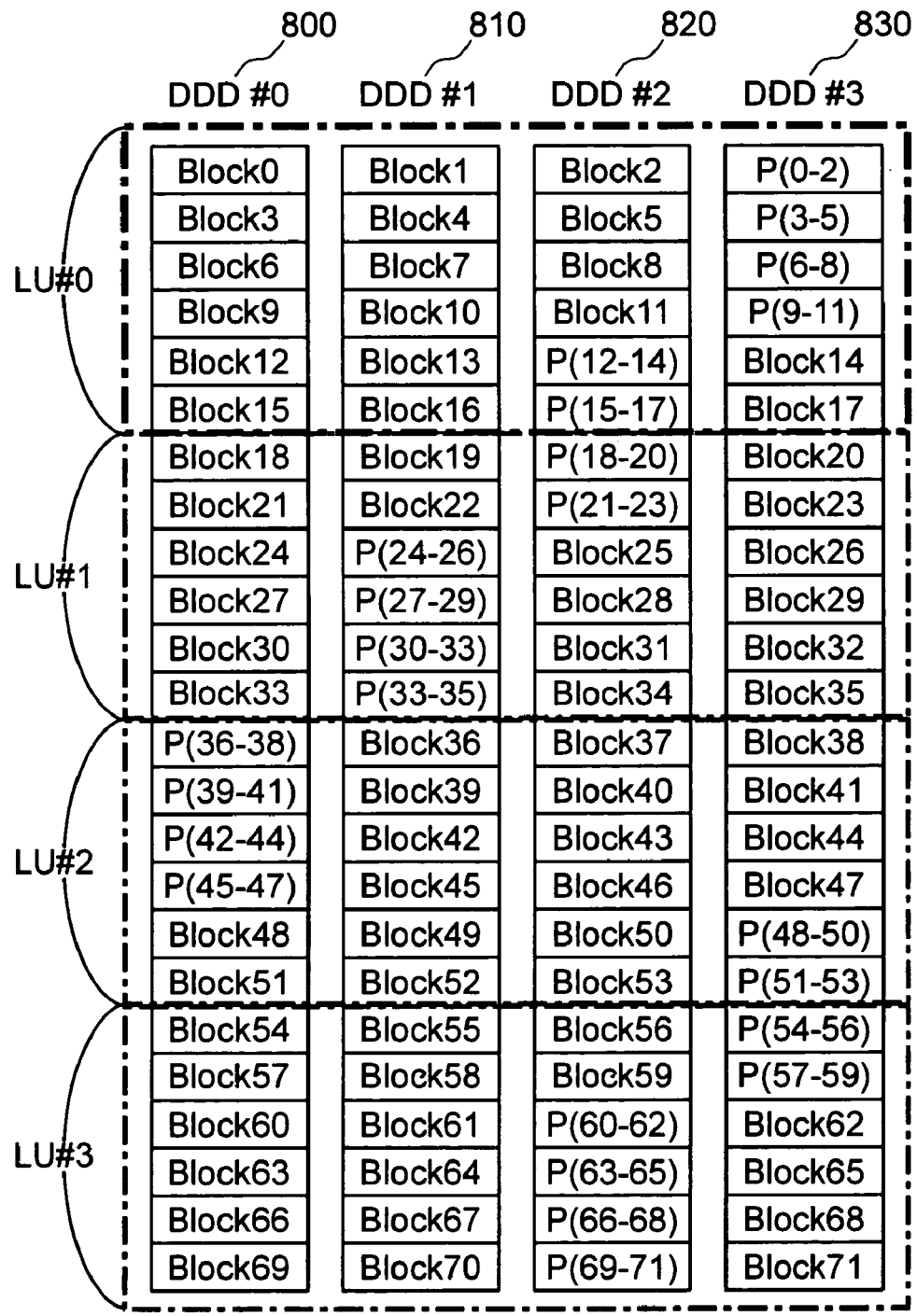
FIG. 13 is a diagram showing a modification of the structure of a parity group.

In addition, the above-mentioned embodiments has been described with reference to a disk array, which constitutes the parity group of the 3D+1P format in accordance with the "RAID-5" technique, as an example. However, it is evident that the present invention is applicable to a disk array, which constitutes a parity group of other forms in accordance with any one of the "RAID-1" to the "RAID-5" techniques. For example, even in the parity group of the 3D+1P format, there are the example shown in FIG. 13 and other variations in an arrangement of parity data. The present invention is applicable to any one of those variations.

In addition, in the above-mentioned embodiments, the disk array device controls the operations of the divided data copy, the dynamic sparing, and the like independently from a command from an external device, such as a host device. However, such control may be performed according to a command from an external device.

What is claimed is:

1. A disk array device for storing data in response to communications from a host device, the disk array device comprising:
    a disk array control unit which performs control of the entire disk array device;
    a host side data transfer control unit which controls data transfer to and from the host device;
    a disk array including at least a plurality of data disk drives which constitute one parity group and one or more spare disk drives, wherein the one parity group has a large number of data stripes which are formed over storage areas of the plural data disk drives and the large number of data stripes can be partitioned into two or more sets of the data stripes;
    a cache memory which is used for temporary storage of data to be transferred between the host device and the disk array; and
    a subordinate side transfer control unit which controls data transfer to and from the disk array,
    wherein the disk array control unit comprises:
        a prediction section which predicts the likelihood of occurrence of a failure for each data disk drive,
        a disk drive resource information table which includes for each data disk drive information indicating a status of said data disk drive and information of a rate of occurrence of errors in said data disk drive,
        a spare disk drive resource information table which includes for each spare disk drive information indicating a status of said spare disk drive and information regarding storage areas of said spare disk drive used for recovery with respect to a corresponding data disk drive,
    wherein said prediction section predicts the likelihood of occurrence of a failure based on information contained in said disk drive resource information table, and
    a divided data copy section which, in response to a prediction that occurrence of a failure is likely to occur with respect to a data disk drive, and based on information contain in said spare disk drive resource information table, selects two or more data disk drives out of the plural data disk drives as objects of divided data copy, selects two or more divided storage areas by selecting one divided storage area from each of the selected two or more data disk drives, the selected two or more divided storage areas belonging to different sets of the data stripes in the parity group, and controls the subordinate side transfer control unit and the cache memory so as to copy data in the selected two or more divided storage areas to the one or more spare disk drives.

2. A disk array device according to claim 1, wherein the disk array control unit further comprises a dynamic sparing section which selects one data disk drive as an object of dynamic sparing out of the plural data disk drives according to the predicted likelihood of occurrence of a failure, selects remaining divided storage areas, from which data has not been copied by the divided data copy section, from the selected one data disk drive, and controls the subordinate side transfer control units and the cache memory so as to copy data in the selected remaining divided storage areas to the spare disk drives.

3. A disk array device according to claim 2, wherein, in the case in which the predicted likelihood of occurrence of a failure of a first data disk drive in the plural data disk drives has reached a first level, the divided data copy section selects at least the first data disk drive and a separate second data disk drive as objects of the divided data copy, and
in the case in which the predicted likelihood of occurrence of a failure of the first data disk drive has reached a second level which is higher than the first level, the dynamic sparing section selects the first data disk drive as an object of the dynamic sparing.

4. A disk array device according to claim 1, wherein, in the case in which the predicted likelihood of occurrence of a failure of the first disk drive among the plural disk drives has reached a predetermined level, the divided data copy section selects the first data disk drive and a second data disk drive, which has the largest predicted likelihood of occurrence of a failure after the first data disk drive, as objects of the divided data copy.

5. A disk array device according to claim 1, wherein the divided data copy section controls the subordinate side transfer control unit and the cache memory so as to read out data simultaneously from the selected two or more divided storage areas in a course of copying the data in the selected two or more divided storage areas.

6. A disk array device according to claim 1,
wherein the disk array control unit further comprises a spare data updating section which, in the case in which a new request for writing data in the selected two or more divided storage areas from the host device is received from the host side data transfer unit after the data in the selected two or more divided storage areas is started to be copied to the one or more spare disk drives, controls the subordinate side transfer control unit and the cache memory so as to write the new data received from the host device in the selected two or more divided storage areas and write the data in the spare disk drives as well.

7. A disk array device according to claim 1,
wherein the divided data copy section selects first and second data disk drives as objects of the divided data copy from the plural data disk drives, selects a first divided storage area belonging to a set of front side data stripes in the parity groups from the first data disk drive, selects a second divided storage area belonging to a set of rear side data stripes following the set of front side data stripes from the second data disk drive, and controls the subordinate side transfer control unit and the cache memory so as to copy data in the first and the second divided storage areas to the spare disk drives.

8. A disk array device according to claim 1,
wherein the two or more divided storage areas selected from the two or more data disk drives by the divided data copy section have substantially the same size.

9. A disk array device according to claim 1,
wherein the two or more divided storage areas selected from the two or more data disk drives by the divided data copy section have different sizes according to the predicted likelihood of occurrence of a failure of the two or more data disk drives.

10. A disk array device according to claim 1,
wherein the prediction section stores an error occurrence history for each of the data disk drives and predicts the likelihood of occurrence of a failure for each of the data disk drives on the basis of the stored error occurrence history.

11. A method for use in a disk array device, which can be connected to a host device so that they are capable of communicating with each other, comprising:
a disk array control unit which performs control of the entire disk array device;
a host side data transfer control unit which controls data transfer to and from the host device;
a disk array including at least plural data disk drives which constitute one parity group and one or more spare disk drives, wherein the one parity group has a large number of data stripes which are formed over storage areas of the plural data disk drives and the large number of data stripes can be partitioned into two or more sets of the data stripes;
a cache memory which is used for temporary storage of data to be transferred between the host device and the disk array; and
a subordinate side transfer control unit which controls data transfer to and from the disk array,
wherein said disk array control unit includes a disk drive resource information table which includes for each data disk drive information indicating a status of said data disk drive and information of a rate of occurrence of errors in said data disk drive and a spare disk drive resource information table which includes for each spare disk drive information indicating a status of said spare disk drive and information regarding storage areas of said spare disk drive used for recovery with respect to a corresponding data disk drive,
wherein the disk array control unit operating to spare data in the data disk drive using the spare disk drive, the method comprising:
a step of predicting the likelihood of occurrence of a failure for each of the disk drives based on information contained in said disk drive resource information table,
a step of, in response to a prediction that occurrence of a failure is likely to occur with respect to a data disk drive and based on information contain in said spare disk drive resource information table, selecting two or more data disk drives as objects of divided data copy out of the plural data disk drives;
a step of selecting two or more divided storage areas by selecting one divided storage area from each of the selected two or more data disk drives, wherein the selected two or more divided storage areas belong to different sets of data stripes in the parity group; and
a step of performing the divided data copy by controlling the subordinate side transfer control unit and the cache memory so as to copy data of the selected two or more divided storage areas to the one or more spare disk drives.

12. A method according to claim 11, further comprising:
a step of selecting one data disk drive as an object of dynamic sparing out of the plural data disk drives according to the predicted likelihood of occurrence of a failure; and
a step of selecting remaining divided storage areas, from which data has not been copied to the spare disks, from the selected one data disk drive, and controlling the subordinate side transfer control units and the cache memory so as to copy data in the selected remaining divided storage areas to the spare disk drives.

13. A method according to claim 12,
wherein the step of selecting two or more data disk drives is performed in the case in which the predicted likelihood of occurrence of a failure of a first data disk drive among the plural data disk drives has reached a first level, and then at least the first data disk drive and a separate second data disk drive are selected as objects of the divided data copy, and
the step of selecting one data disk drive is performed in the case in which the predicted likelihood of occurrence of a failure of the first data disk drive has reached a second level higher than the first level, and then the first data disk drive is selected as an object of the dynamic sparing.

14. A method according to claim 11,
wherein the step of selecting two or more data disk drives is performed in the case in which the predicted likelihood of occurrence of a failure of the first disk drive among the plural disk drives has reached a predetermined level, and then the first data disk drive and a second data disk drive, which has the highest predicted likelihood of occurrence of a failure after the first data disk drive, are selected as objects of the divided data copy.

15. A method according to claim 11,
wherein, in the controlling step, the subordinate side transfer control unit and the cache memory are controlled so as to read out data simultaneously from the selected two or more divided storage areas.

16. A method according to claim 11, further comprising a step of, in the case in which a new request for writing data in the selected two or more divided storage areas from the host device is received from the host side data transfer unit after the step of performing the divided data copy is started, controlling the subordinate side transfer control unit and the cache memory so as to write the new data received from the host device in the selected two or more divided storage areas and write the data in the spare disk drives as well to thereby update the data in the spare disks.

17. A method according to claim 11,
wherein, in the step of selecting two or more data disk drives, first and second data disk drives are selected out of the plural data disk drives, and in the step of selecting two or more divided storage areas, a first divided storage area belonging to a set of front side data stripes in the parity groups is selected from the first data disk drive, and a second divided storage area belonging to a set of rear side data stripes following the set of front side data stripes is selected from the second data disk drive.

18. A method according to claim 11,
wherein, in the step of selecting two or more divided storage areas, two or more divided storage areas having substantially the same size are selected.

19. A method according to claim 11,
wherein, in the step of selecting two or more divided storage areas, two or more divided storage areas having different sizes are selected according to the likelihood of occurrence of a failure predicted for the two or more data disk drives.

20. A data sparing control device for use in a disk array device, which can be connected to a host device so that they are capable of communicating with each other, comprising:
a disk array control unit which performs control of the entire disk array device;
a host side data transfer control unit which controls data transfer to and from the host device;
a disk array including at least plural data disk drives which constitute one parity group and one or more spare disk drives, wherein the one parity group has a large number of data stripes which are formed over storage areas of the plural data disk drives and the large number of data stripes can be partitioned into two or more sets of the data stripes;
a cache memory which is used for temporary storage of data to be transferred between the host device and the disk array; and
a subordinate side transfer control unit which controls data transfer to and from the disk array,
wherein for controlling an operation for sparing data in the data disk drives using the spare disk drives, the data sparing control device comprises:
a prediction unit which predicts the likelihood of occurrence of a failure for each of the data disk drives,
wherein said prediction section includes a disk drive resource information table which includes for each data disk drive information indicating a status of said data disk drive and information of a rate of occurrence of errors in said data disk drive and a spare disk drive resource information table which includes for each spare disk drive information indicating a status of said spare disk drive and information regarding storage areas of said spare disk drive used for recovery with respect to a corresponding data disk drive,
wherein said prediction section predicts the likelihood of occurrence of a failure based on information contained in said disk drive resource information table,
a divided area selection unit which, in response to a prediction that occurrence of a failure is likely to occur with respect to a data disk drive and based on information contain in said spare disk drive resource information table, selects two or more data disk drives as objects of divided data copy out of the plural data disk drives and selects two or more divided storage areas by selecting one divided storage area from each of the selected two or more data disk drives, wherein the selected two or more divided storage areas belong to different sets of data stripes in the parity group; and
a divided data copy unit which controls the subordinate side transfer control unit and the cache memory so as to copy data of the selected two or more divided storage areas to the spare disk drives.

21. A disk array device for storing data in response to communications from a host device, the disk array device comprising:
a disk array control unit which performs control of the entire disk array device;
a host side data transfer control unit which controls data transfer to and from the host device;
a disk array including at least a plurality of data disk drives which constitute one parity group and one or more spare disk drives, wherein the one parity group has a large number of data stripes which are formed over storage areas of the plural data disk drives and the large number of data stripes can be partitioned into two or more sets of the data stripes;
a cache memory which is used for temporary storage of data to be transferred between the host device and the disk array; and
a subordinate side transfer control unit which controls data transfer to and from the disk array,
wherein the disk array control unit comprises:
a prediction section which predicts the likelihood of occurrence of a failure for each data disk drive,
a disk drive resource information table which includes for each data disk drive information indicating a status of said data disk drive and information of a rate of occurrence of errors in said data disk drive,
a spare disk drive resource information table which includes for each spare disk drive information indicating a status of said spare disk drive and information regarding storage areas of said spare disk drive used for recovery with respect to a corresponding data disk drive,
wherein said prediction section predicts the likelihood of occurrence of a failure based on information contained in said disk drive resource information table, and
a divided data copy section which, in response to a prediction that occurrence of a failure is likely to occur with respect to a data disk drive, and based on information contain in said spare disk drive resource information table, selects two or more data disk drives out of the plural data disk drives as objects of divided data copy, selects two or more divided storage areas by selecting one divided storage area from each of the selected two or more data disk drives, the selected two or more divided storage areas belonging to different sets of the data stripes in the parity group, and controls the subordinate side transfer control unit and the cache memory so as to copy data in the selected two or more divided storage areas to the one or more spare disk drives wherein when the probability of failure occurring in a first data disk drive of the plurality of data disk drives reaches a first level, the divided data copy section selects two or more data disk drives including the first data disk drive out of the plurality of data disk drives as objects of divided data copy, selects two or more divided storage areas by selecting one divided storage area from each of the selected two or more data storage drives, and then performs a divided copying process, wherein in the divided copying process, data stored in the divided storage areas of the selected two or more data disk drives are copied to one or more spare disks, but data stored in other storage areas of the selected two or more data disk drives are not copied to the spare disks, wherein data in each of the other storage areas of the selected two or more data disk drives include data that are not parity data, and wherein after performing the divided copying process, when the probability of the failure occurring in either one of the selected two or more data disk drives reaches a second level, which is higher than the first level, the divided data copy section copies the data stored in the other storage areas of the selected two or more data disk drives to the one or more spare disks.

22. A disk array device according to claim 21, wherein the disk array control unit further comprises a dynamic sparing section which selects one data disk drive as an object of dynamic sparing out of the plural data disk drives according to the predicted likelihood of occurrence of a failure, selects remaining divided storage areas, from which data has not been copied by the divided data copy section, from the selected one data disk drive, and controls the subordinate side transfer control units and the cache memory so as to copy data in the selected remaining divided storage areas to the spare disk drives.

23. A disk array device according to claim 22, wherein, in the case in which the predicted likelihood of occurrence of a failure of a first data disk drive in the plural data disk drives has reached a first level, the divided data copy section selects at least the first data disk drive and a separate second data disk drive as objects of the divided data copy, and in the case in which the predicted likelihood of occurrence of a failure of the first data disk drive has reached a second level which is higher than the first level, the dynamic sparing section selects the first data disk drive as an object of the dynamic sparing.

24. A disk array device according to claim 21, wherein, in the case in which the predicted likelihood of occurrence of a failure of the first disk drive among the plural disk drives has reached a predetermined level, the divided data copy section selects the first data disk drive and a second data disk drive, which has the largest predicted likelihood of occurrence of a failure after the first data disk drive, as objects of the divided data copy.

* * * * *